(12) United States Patent
Badiger et al.

(10) Patent No.: US 11,698,737 B2
(45) Date of Patent: Jul. 11, 2023

(54) LOW-LATENCY SHARED MEMORY CHANNEL ACROSS ADDRESS SPACES WITHOUT SYSTEM CALL OVERHEAD IN A COMPUTING SYSTEM

(71) Applicant: VMware, Inc., Palo Alto, CA (US)

(72) Inventors: Mounesh Badiger, Bangalore (IN); Wenguang Wang, Santa Clara, CA (US); Adrian Drzewiecki, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/647,291

(22) Filed: Jan. 6, 2022

(65) Prior Publication Data
US 2022/0129175 A1 Apr. 28, 2022

Related U.S. Application Data

(63) Continuation of application No. 17/012,411, filed on Sep. 4, 2020, now Pat. No. 11,249,660.

(30) Foreign Application Priority Data

Jul. 17, 2020 (IN) .............................. 202041030577

(51) Int. Cl.
*G06F 3/06* (2006.01)
*G06F 12/10* (2016.01)
(Continued)

(52) U.S. Cl.
CPC .......... *G06F 3/0631* (2013.01); *G06F 3/0604* (2013.01); *G06F 3/0664* (2013.01);
(Continued)

(58) Field of Classification Search
CPC .. G06F 3/0631; G06F 16/172; G06F 12/0646; G06F 3/0604; G06F 3/0664;
(Continued)

(56) References Cited

U.S. PATENT DOCUMENTS 8,938,571 B1 * 1/2015 Vincent ................. G06F 9/5077
710/118
9,047,018 B1 6/2015 Ananthabhotla
(Continued)

OTHER PUBLICATIONS

Bricker, Allan et al., A New Look at Microkernel-Based UNIX Operating Systems: Lessons in Performance and Compatibility, In Proceedings of the EurOpen Spring '91 Conference, Tromsoe, Norway, May 20-24, 1991.
(Continued)

*Primary Examiner* — Sean D Rossiter
(74) *Attorney, Agent, or Firm* — Dinsmore & Shohl LLP

(57) ABSTRACT

Examples provide a method of communication between a client application and a filesystem server in a virtualized computing system. The client application executes in a virtual machine (VM) and the filesystem server executes in a hypervisor. The method includes: allocating, by the client application, first shared memory in a guest virtual address space of the client application; creating a guest application shared memory channel between the client application and the filesystem server upon request by the client application to a driver in the VM, the driver in communication with the filesystem server, the guest application shared memory channel using the first shared memory; sending authentication information associated with the client application to the filesystem server to create cached authentication information at the filesystem server; and submitting a command in the guest application shared memory channel from the client application to the filesystem server, the command including the authentication information.

20 Claims, 11 Drawing Sheets

(51) Int. Cl.
*G06F 9/455* (2018.01)
*G06F 12/06* (2006.01)
*G06F 21/44* (2013.01)
*G06F 16/172* (2019.01)

(52) U.S. Cl.
CPC ........ *G06F 3/0673* (2013.01); *G06F 9/45558* (2013.01); *G06F 12/0646* (2013.01); *G06F 12/10* (2013.01); *G06F 16/172* (2019.01); *G06F 21/44* (2013.01); *G06F 2009/45583* (2013.01); *G06F 2212/152* (2013.01); *G06F 2212/163* (2013.01); *G06F 2212/657* (2013.01)

(58) Field of Classification Search
CPC ...... G06F 12/10; G06F 9/45558; G06F 21/44; G06F 3/0673; G06F 2212/163; G06F 2009/45583; G06F 2212/657; G06F 2212/152
See application file for complete search history.

(56) References Cited

U.S. PATENT DOCUMENTS

| | | | |
|---|---|---|---|
| 9,542,112 | B2 | 1/2017 | Drzewiecki et al. |
| 9,760,493 | B1 | 9/2017 | Wang |
| 2002/0032844 | A1 | 3/2002 | West |
| 2004/0107419 | A1 | 6/2004 | Blackmore et al. |
| 2006/0167955 | A1 | 7/2006 | Vertes |
| 2008/0155183 | A1 | 6/2008 | Zhuang et al. |
| 2009/0210635 | A1 | 8/2009 | Blackmore et al. |
| 2010/0211829 | A1* | 8/2010 | Ziskind ............... G06F 11/0757 714/48 |
| 2010/0325391 | A1* | 12/2010 | Talla .................... G06F 13/362 712/31 |
| 2011/0082962 | A1* | 4/2011 | Horovitz ............... G06F 11/301 718/1 |
| 2012/0054445 | A1 | 3/2012 | Swart et al. |
| 2012/0054447 | A1 | 3/2012 | Swart et al. |
| 2015/0026412 | A1 | 1/2015 | Eads et al. |
| 2016/0042195 | A1* | 2/2016 | Agarwal ............. G06F 21/6218 726/17 |
| 2016/0044041 | A1* | 2/2016 | Agarwal ............. G06F 9/45558 726/4 |
| 2016/0147993 | A1* | 5/2016 | Xu ........................ G06F 21/53 726/22 |
| 2016/0275042 | A1 | 9/2016 | Pathak et al. |
| 2022/0019362 | A1* | 1/2022 | Badiger ............. G06F 9/45558 |

OTHER PUBLICATIONS

Fiala, David et al., Detection and Correction of Silent Data Corruption for Large-Scale High-Performance Computing, In Proceedings of the International Conference on High Performance Computing, Networking, Storage and Analysis, SC '12, pp. 78:1-78:12, Los Alamitos, CA USA, 2012. IEEE Computer Society Press.

Jeong, EunYoung et al., A Highly Scalable User-level TCP Stack for Multicore Systems, http://shader.kaist.edu/mtcp/, Last updated Apr. 4, 2014.

Johnson, Theodore et al., 2Q: A Low Overhead High Performance Buffer Management Replacement Algorithm, Proceedings of the 20th VLDB Conference, Santiago, Chile, 1994, pp. 439-450.

Thomas K., User Space Networking Fuels NFV Performance, https://software.intel.com/en-us/blogs/2015/06/12/userspacenetworking-he 2oth VLDB Conference, Santiago, Chile, 1994, pp. 439-450. fuels-nfv-performance.

Panzer-Steindel, Bernd, Data integrity, https://indico.cern.ch/event/13797/contributions/1362288/attachments/115080/163419/Data_integrity_v3.pdf, Apr. 2007.

Peter, Simon et al., Arrakis: The Operating System is the Control Plane. In 11th USENIX Symposium on Operating Systems Design and Implementation (OSOi 14), pp. 1-16, CO, Oct. 2014. USENIX Association.

VFIO—virtual function i/o. https:/lwww.kemel.org/doc/Documentation/vlio.txt.

* cited by examiner

LOW-LATENCY SHARED MEMORY CHANNEL ACROSS ADDRESS SPACES WITHOUT SYSTEM CALL OVERHEAD IN A COMPUTING SYSTEM

RELATED APPLICATIONS

This application is a continuation of U.S. patent application Ser. No. 17/012,411, filed Sep. 4, 2020, which claims the benefit of Indian Patent Application No. 202041030577, filed Jul. 17, 2020, the entire contents of each of which are incorporated by reference herein.

BACKGROUND

Computer virtualization is a technique that involves encapsulating a physical computing machine platform into virtual machine(s) executing under control of virtualization software on a hardware computing platform or "host." A virtual machine (VM) provides virtual hardware abstractions for processor, memory, storage, and the like to a guest operating system. The virtualization software, also referred to as a "hypervisor," incudes one or more virtual machine monitors (VMMs) to provide execution environment(s) for the virtual machine(s). As physical hosts have grown larger, with greater processor core counts and terabyte memory sizes, virtualization has become key to the economic utilization of available hardware.

Virtualized hosts can be organized as part of a host cluster managed by a virtualization manager server. Local storage devices in the hosts can be aggregated and organized as a part of a virtual storage area network (vSAN) for the host cluster. A distributed filesystem (e.g., VDFS) is built on top of a vSAN and shares of the filesystem are managed by a filesystem server executing in user-space of the hypervisor. Clients executing in VMs can access the file shares on the vSAN by cooperating with the filesystem server. Since the clients and filesystem server operate in different address spaces, communication between clients and server involves multiple system calls and hence context switches. These context switches and system calls add latency when accessing the vSAN from within VMs, which is not desirable for most applications.

SUMMARY

One or more embodiments provide a method of communication between a client application and a filesystem server in a virtualized computing system. The client application executes in a virtual machine (VM) and the filesystem server executes in a hypervisor managing the VM. The method includes: allocating, by the client application, first shared memory in a guest virtual address space of the client application; creating a guest application shared memory channel between the client application and the filesystem server upon request by the client application to a driver in the VM, the driver in communication with the filesystem server, the guest application shared memory channel using the first shared memory; sending authentication information associated with the client application to the filesystem server to create cached authentication information at the filesystem server; and submitting a command in the guest application shared memory channel from the client application to the filesystem server, the command including the authentication information.

Further embodiments include a non-transitory computer-readable storage medium comprising instructions that cause a computer system to carry out the above method, as well as a computer system configured to carry out the above method. Though certain aspects are described with respect to VMs, they may be similarly applicable to other suitable physical and/or virtual computing instances.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
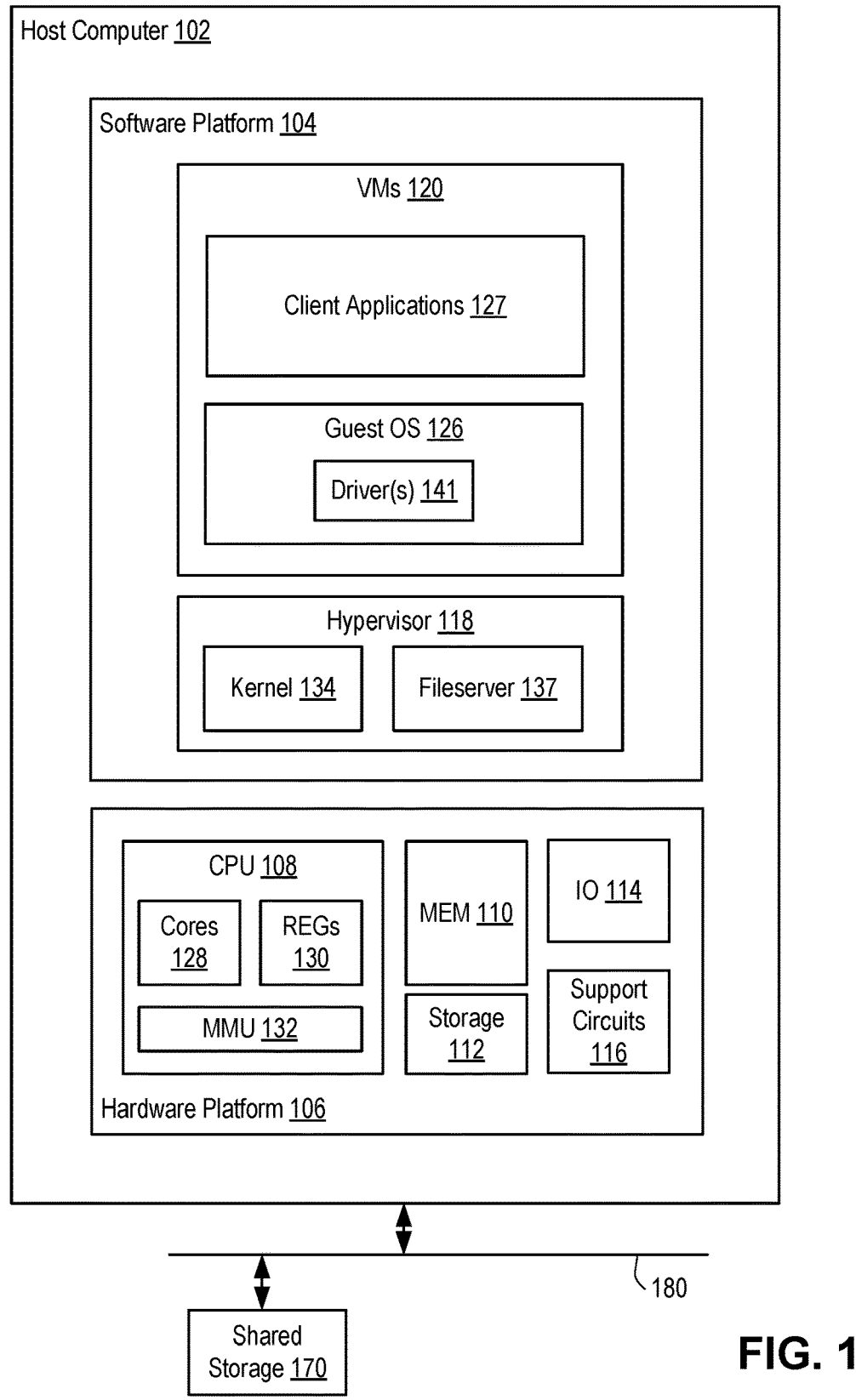
FIG. 1 is a block diagram depicting a virtualized computing system according to an embodiment.

FIG. 1 is a block diagram depicting a virtualized computing system 100 according to an embodiment. Virtualized computing system 100 includes a host computer 102 having a software platform 104 executing on a hardware platform 106. Hardware platform 106 may include conventional components of a computing device, such as a central processing unit (CPU) 108, system memory (MEM) 110, a storage system (storage) 112, input/output devices (IO) 114, and various support circuits 116. CPU 108 is configured to execute instructions, for example, executable instructions that perform one or more operations described herein and may be stored in system memory 110 and storage system 112. System memory 110 is a device allowing information, such as executable instructions, virtual disks, configurations, and other data, to be stored and retrieved. System memory 110 may include, for example, one or more random access memory (RAM) modules. Storage system 112 includes local storage devices (e.g., one or more hard disks, flash memory modules, solid state disks, and optical disks) and/or a storage interface that enables host computer 102 to communicate with one or more network data storage systems. Examples of a storage interface are a host bus adapter (HBA) that couples host computer 102 to one or more storage arrays, such as a storage area network (SAN) or a network-attached storage (NAS), as well as other network data storage systems. Storage 112 in multiple hosts 102 can be aggregated and provisioned as part of shared storage 170 accessible through a physical network 180. Shared storage 170 can be a virtual SAN (vSAN), which is an aggregation of local storage 112 across multiple host computers 102 into a single filesystem. Input/output devices 114 include conventional interfaces known in the art, such as one or more network interfaces. Support circuits 116 include conventional cache, power supplies, clock circuits, data registers, and the like.

CPU 108 includes one or more cores 128, various registers 130, and a memory management unit (MMU) 132. Each core 128 is a microprocessor, such as an x86 microprocessor. Registers 130 include program execution registers for use by code executing on cores 128 and system registers for use by code to configure CPU 108. Code is executed on CPU 108 at a particular privilege level selected from a set of privilege levels. For example, x86 microprocessors from Intel Corporation include four privilege levels ranging from level 0 (most privileged) to level 3 (least privileged). Privilege level 3 is referred to herein as "a user privilege level" and privilege levels 0, 1, and 2 are referred to herein as "supervisor privilege levels." Code executing at the user privilege level is referred to as user-mode code. Code executing at a supervisor privilege level is referred to as supervisor-mode code or kernel-mode code. Other CPUs can include a different number of privilege levels and a different numbering scheme. In CPU 108, at least one register 130 stores a current privilege level (CPL) of code executing thereon.

MMU 132 supports paging of system memory 110. Paging provides a "virtual memory" environment where a virtual address space is divided into pages, which are either stored in system memory 110 or in storage 112. "Pages" are individually addressable units of memory. Each page (also referred to herein as a "memory page") includes a plurality of separately addressable data words, each of which in turn includes one or more bytes. Pages are identified by addresses referred to as "page numbers." CPU 108 can support one or more page sizes. For example, modern x86 CPUs can support 4 kilobyte (KB), 2 megabyte (MB), 4 MB, and 1 gigabyte (GB) page sizes. Other CPUs may support other page sizes.

MMU 132 translates virtual addresses in the virtual address space (also referred to as virtual page numbers) into physical addresses of system memory 110 (also referred to as machine page numbers). MMU 132 also determines access rights for each address translation. An executive (e.g., operating system, hypervisor, etc.) exposes page tables to CPU 108 for use by MMU 132 to perform address translations. Page tables can be exposed to CPU 108 by writing pointer(s) to control registers and/or control structures accessible by MMU 132. Page tables can include different types of paging structures depending on the number of levels in the hierarchy. A paging structure includes entries, each of which specifies an access policy and a reference to another paging structure or to a memory page.

CPU 108 can include hardware-assisted virtualization features, such as support for hardware virtualization of MMU 132. For example, modern x86 processors commercially available from Intel Corporation include support for MMU virtualization using extended page tables (EPTs). Likewise, modern x86 processors from Advanced Micro Devices, Inc. include support for MMU virtualization using Rapid Virtualization Indexing (RVI). Other processor platforms may support similar MMU virtualization. In general, CPU 108 can implement hardware MMU virtualization using nested page tables (NPTs). In a virtualized computing system, a guest OS in a VM maintains page tables (referred to as guest page tables) for translating virtual addresses to physical addresses for a virtual memory provided by the hypervisor (referred to as guest physical addresses). The hypervisor maintains NPTs that translate guest physical addresses to physical addresses for system memory 110 (referred to as machine addresses). Each of the guest OS and the hypervisor exposes the guest paging structures and the NPTs, respectively, to the CPU 108. MMU 132 translates virtual addresses to machine addresses by walking the guest page structures to obtain guest physical addresses, which are used to walk the NPTs to obtain machine addresses.

Software platform 104 includes a virtualization layer that abstracts processor, memory, storage, and networking resources of hardware platform 106 into one or more virtual machines ("VMs") that run concurrently on host computer 102. The VMs run on top of the virtualization layer, referred to herein as a hypervisor, which enables sharing of the hardware resources by the VMs. In the example shown, software platform 104 includes a hypervisor 118 that supports VMs 120. One example of hypervisor 118 that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein). Hypervisor 118 includes a kernel 134 and a fileserver 137. Kernel 134 maintains NPTs on behalf of its VM(s), which are exposed to CPU 108, and performs various other operating system and hypervisor functions. Fileserver 137 provides an interface to shared storage 170.

Each VM 120 includes guest software (also referred to as guest code) that runs on the virtualized resources supported by hardware platform 106. In the example shown, the guest software of VM 120 includes a guest OS 126 and client applications 127. Guest OS 126 can be any commodity operating system known in the art (e.g., Linux®, Windows®, etc.). Client applications 127 can be any applications executing on guest OS 126 within VM 120. Client applications 127 can access shared storage 170 using one or more drivers 141 in guest OS 126, which in turn cooperate with fileserver 137. As discussed further herein, drivers 141 cooperate with fileserver 137 to access shared storage 170 using a shared memory channel.

Figure 2:
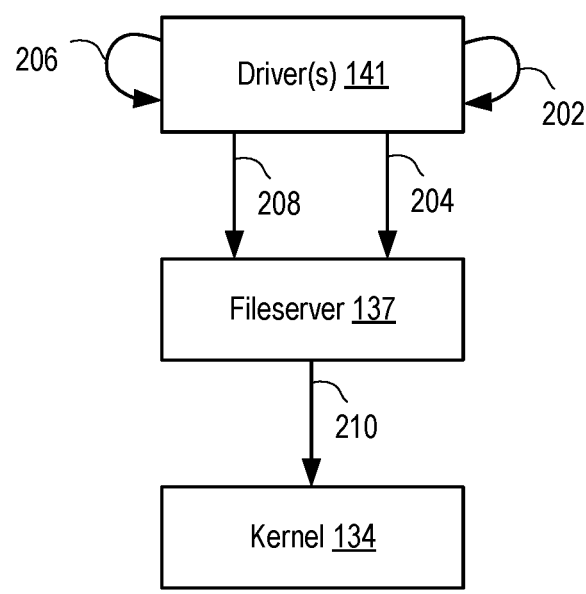
FIG. 2 is a state diagram depicting cooperation between client drivers in a VM, a filesystem server in the hypervisor, and a kernel in the hypervisor according to an embodiment.
Figure 3:
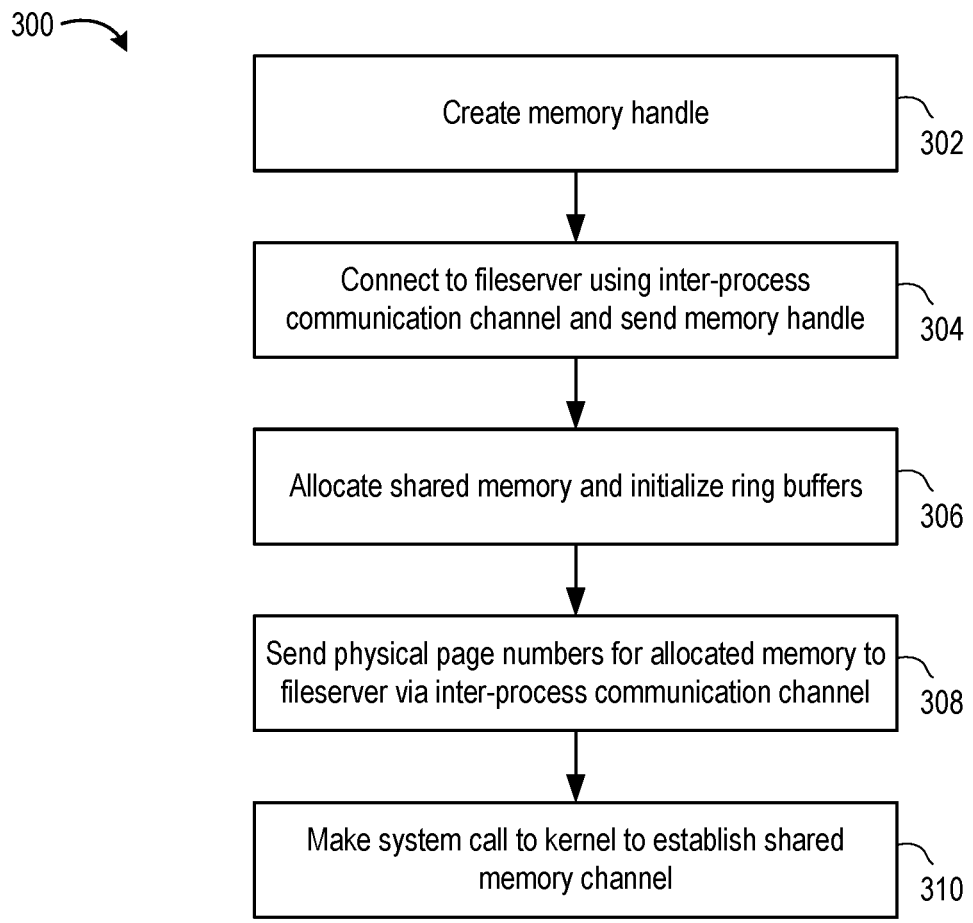
FIG. 3 is a flow diagram depicting a method of communication between a client driver in a VM and a filesystem server in a hypervisor according to an embodiment.

FIG. 2 is a state diagram depicting cooperation between client drivers in a VM, a filesystem server in the hypervisor, and a kernel in the hypervisor according to an embodiment. FIG. 3 is a flow diagram depicting a method 300 of communication between a client driver in a VM and a filesystem server in a hypervisor according to an embodiment.

Method 300 begins at step 302, where a client driver (e.g., driver 141) creates a memory handle on behalf of a client application 127. The memory handle comprises identification information for shared memory in the address space of driver 141 (e.g., a guest physical address space). This is illustrated at state 202 in FIG. 2. In an embodiment, the memory handle includes a start address of a memory region and a length defining a sized of the memory region.

At step 304, driver 141 connects to fileserver 137 using an inter-process communication channel that extends between VM 120 and hypervisor 118. For example, the inter-process communication channel can be a virtual socket between VM 120 and hypervisor 118. Driver 141 then sends the memory handle to fileserver 137 using the inter-process communication channel. This is illustrated in state 204 of FIG. 2.

At step 306, driver 141 allocates shared memory and initializes ring buffers in the shared memory. The ring buffers and initialization are described below. The shared memory is allocated within the address space of driver 141 within constraints of the memory handle. This is illustrated by state 206 in FIG. 2.

At step 308, driver 141 sends physical page numbers for the allocated memory to fileserver 137 using the inter-process communication channel. Driver 141 can cooperate with guest OS 126 to obtain the physical page numbers that correspond to the pages of the shared memory within the guest virtual address space of client application 127. As noted above, guest OS 126 maintains page tables that map guest virtual addresses to guest physical addresses. The physical page numbers comprise guest physical addresses in a guest physical address space of VM 120. This is illustrated in state 208 of FIG. 2.

At step 310, fileserver 137 makes a system call to kernel 134 to establish the shared memory channel between driver 141 and filesystem server 137. As noted above, kernel 134 maintains page tables that map guest physical addresses to machine addresses. Kernel 134 returns machine page numbers for the physical page numbers provided by driver 141. The machine page numbers comprise machine addresses in a machine address space of hypervisor 118. Filesystem server 137 uses the machine page numbers to identify and use the shared memory, establishing the shared memory channel between driver 141 and filesystem server 137. This is illustrated by state 210 in FIG. 2.

Figure 4:
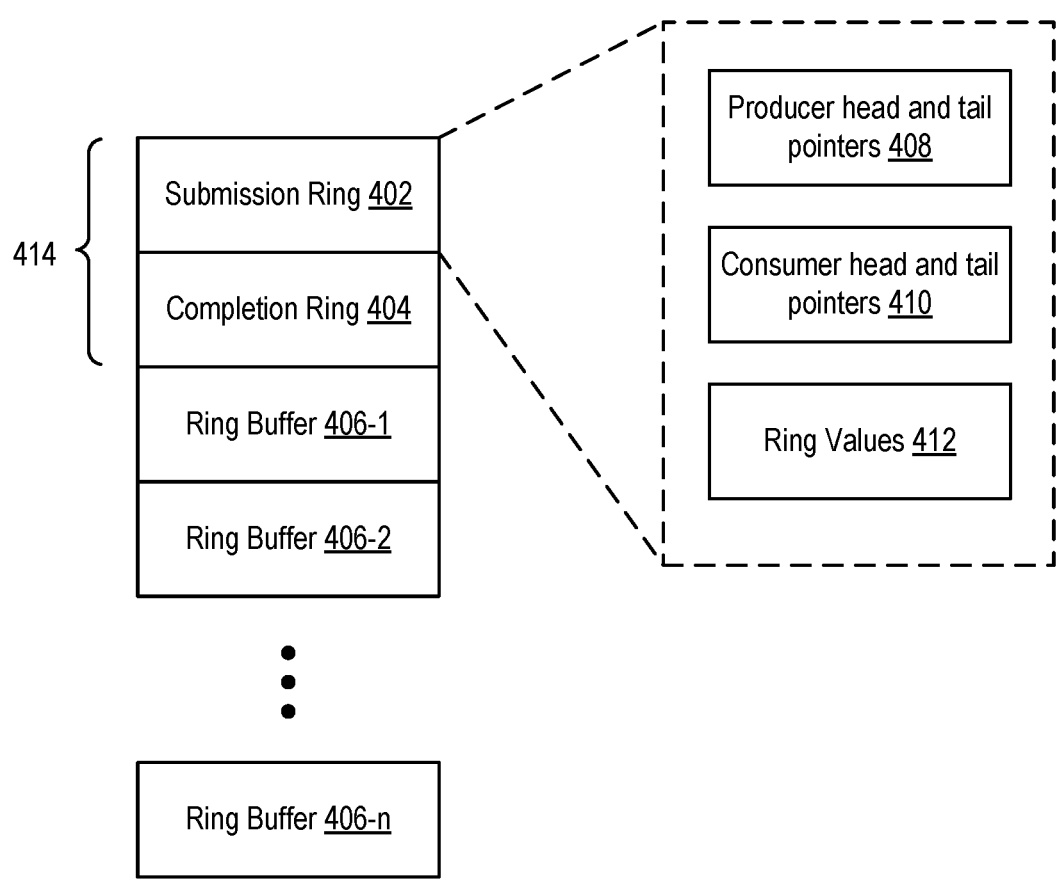
FIG. 4 is a block diagram depicting a structure of a shared memory channel between a client driver and a filesystem server according to an embodiment.

FIG. 4 is a block diagram depicting a structure of a shared memory channel between a client driver and a filesystem server according to an embodiment. The client driver and the filesystem server can have several such memory channels for various client applications executing in the VM. The shared memory channel includes a metadata 414 and a plurality of ring buffers 406 (e.g., ring buffers 406-1, 406-2 . . . 406-n). In an embodiment, metadata 414 includes a submission ring 402 and a completion ring 404. Each of submission ring 402 and completion ring 404 defines a single-producer, single-consumer ring using ring buffers 406. In FIG. 4, details of submission ring 402 are shown. It is to be understood that completion ring 404 can be configured identical or similar to submission ring 402.

Submission ring 402 comprises producer head and tail pointers 408, consumer head and tail pointers 410, and ring values 412. For submission ring 402, the producer is driver 141, which submits commands into the submission ring; the consumer is filesystem server 137, which consumes commands from the submission ring. Producer head and tail pointers 408 define the head and tail of submission ring 402 for driver 141. Driver 141 inserts commands into submission ring 402 at the head as indicated by producer head and tail pointers 408. Consumer head and tail pointers 410 define the head and tail of submission ring 402 for filesystem server 137. Filesystem server 137 pulls commands from submission ring 402 from the head thereof. Ring values 412 are indices of the shared memory pages corresponding to ring buffers 406. The head and tail pointers refer to the indices in ring values 412 to define the head and tail of the submission ring for both producer and consumer. Completion ring 404 is configured similarly, except that filesystem server 137 is the producer of completion messages and driver 141 is the consumer of the completion messages.

Figure 5:
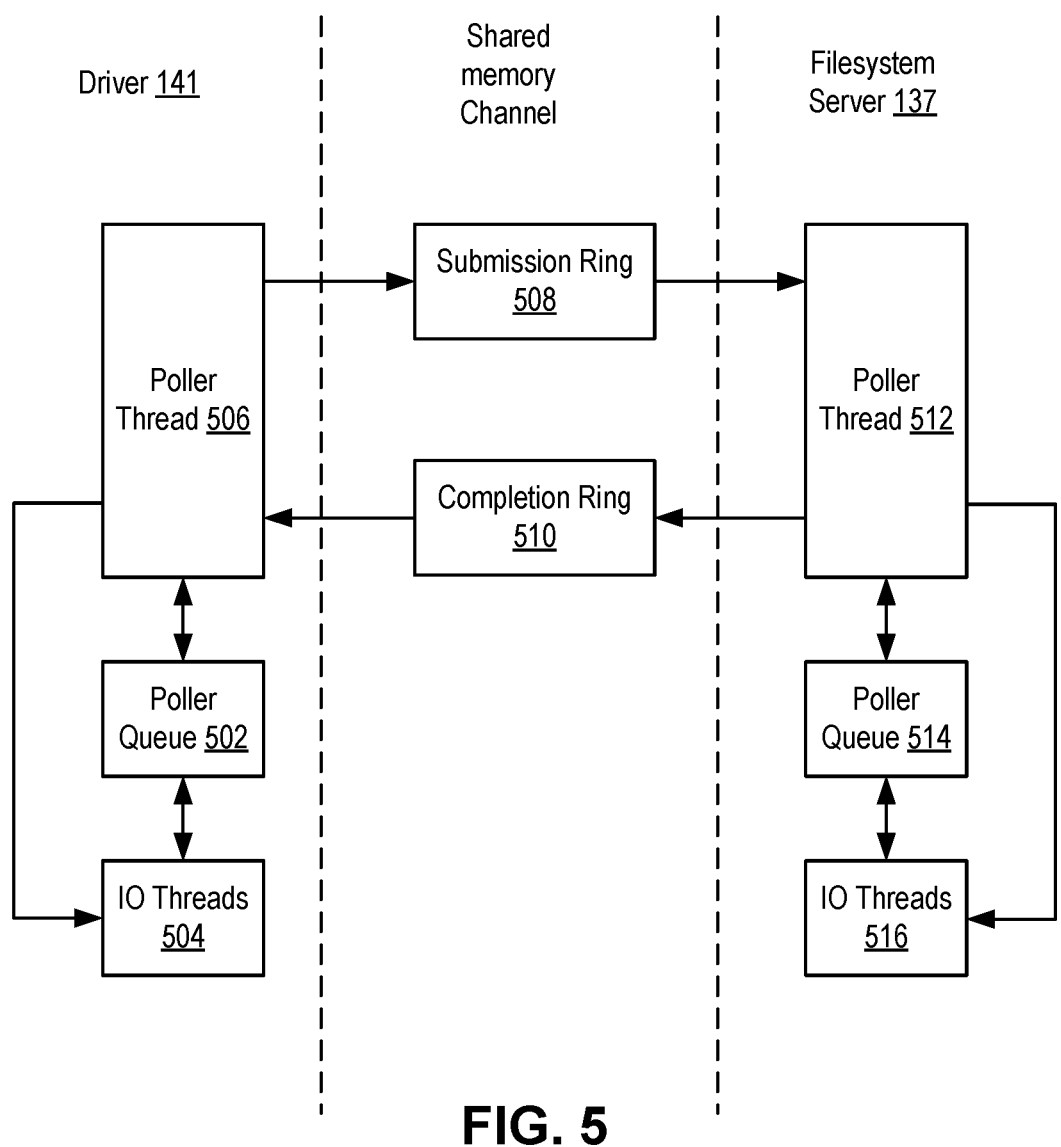
FIG. 5 is a block diagram depicting communication between a client driver and a filesystem server through a shared memory channel as configured in FIG. 4 according to an embodiment.

FIG. 5 is a block diagram depicting communication between driver 141 and filesystem server 137 through a shared memory channel as configured in FIG. 4 according to an embodiment. Driver 141 includes a plurality of input/output (TO) threads 504, a poller queue 502, and a poller thread 506. TO threads 504 receive commands from a client application 137 to be sent to filesystem server 137. TO threads 504 format the commands based on a selected protocol (e.g., 9P) and submit them to the poller queue 502. Poller thread 506 polls poller queue 502 for commands. Poller thread 506 retrieves commands from poller queue 502 and inserts them into submission ring 508. While a command is being processed, an TO thread 504 that submitted the command sleeps and waits for completion.

Filesystem server 137 includes TO threads 516, poller queue 514, and poller thread 512. Poller thread 512 polls submission ring 508 for commands. Poller thread 512 retrieves commands from submission ring 508 and queues them in poller queue 514. Poller thread 512 notifies TO threads 516 of commands to be processed in poller queue 514. Each TO thread 516 obtains a command from poller queue 514 and performs its TO operation on shared storage 170 based on the command (e.g., read or write of data). TO threads 516 provide completion messages to poller queue 514 upon completing commands. Each completion message can indicate success/failure of the command or any other type of metadata related to performance of the command. Poller thread 512 polls poller queue 514 for completion messages and inserts them into completion ring 510.

Poller thread 506 polls completion ring 510 for completion messages. Poller thread 506 inserts completion messages into poller queue 502 and wakes up TO threads 504 to process the completion messages. TO threads 504 can then forward or otherwise respond to client applications 137 based on the completion messages.

Figure 6:
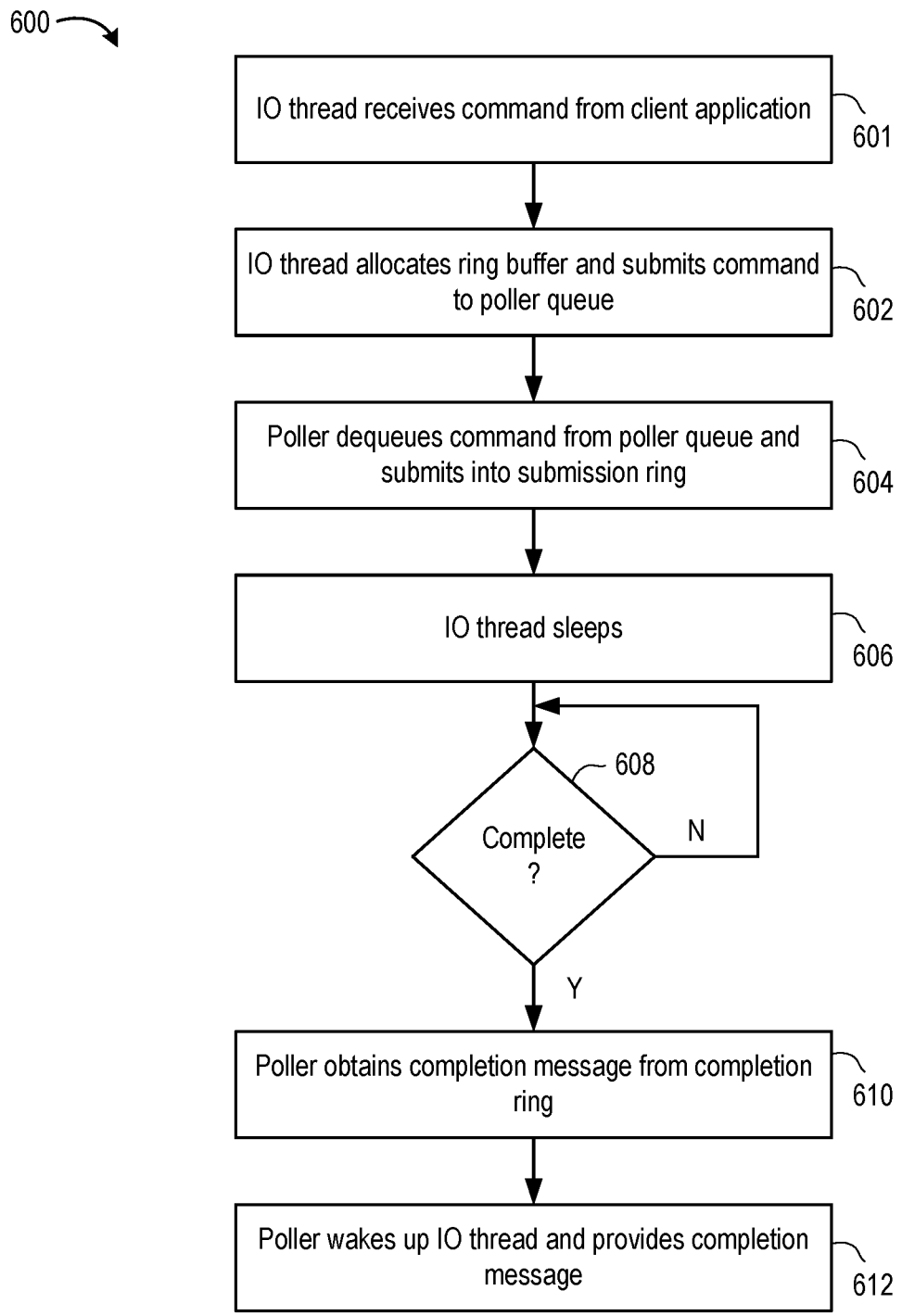
FIG. 6 is a flow diagram depicting a method of sending a command from a client driver to a filesystem server through a shared memory channel according to an embodiment.

FIG. 6 is a flow diagram depicting a method 600 of sending a command from a client driver to a filesystem server through a shared memory channel according to an embodiment. The shared memory channel includes the submission and completion rings, as discussed above.

Method 600 begins at step 601, where an TO thread 504 receives a command from a client application 127. At step 602, TO thread 504 selects a ring buffer in the shared memory channel for the command and submits the command to poller queue 502. At step 604, poller thread 506 dequeues the command from poller queue 502 and submits the command to submission ring 508 by storing the command in the selected ring buffer and adjusting the submission ring metadata (e.g., producer head and tail pointers 408) based on the index of the selected ring buffer.

At step 606, IO thread 504 sleeps while the command is being processed by filesystem server 137. At step 608, poller thread 506 determines if the command is complete by monitoring completion ring 510. If not, poller thread 506 continues to wait for a completion message. Otherwise, method 600 proceeds to step 610, where poller thread 506 obtains a completion message for the command from completion ring 510. At step 612, poller thread 506 wakes up IO thread 504 and IO thread 504 obtains the completion message from poller queue 502.

Figure 7:
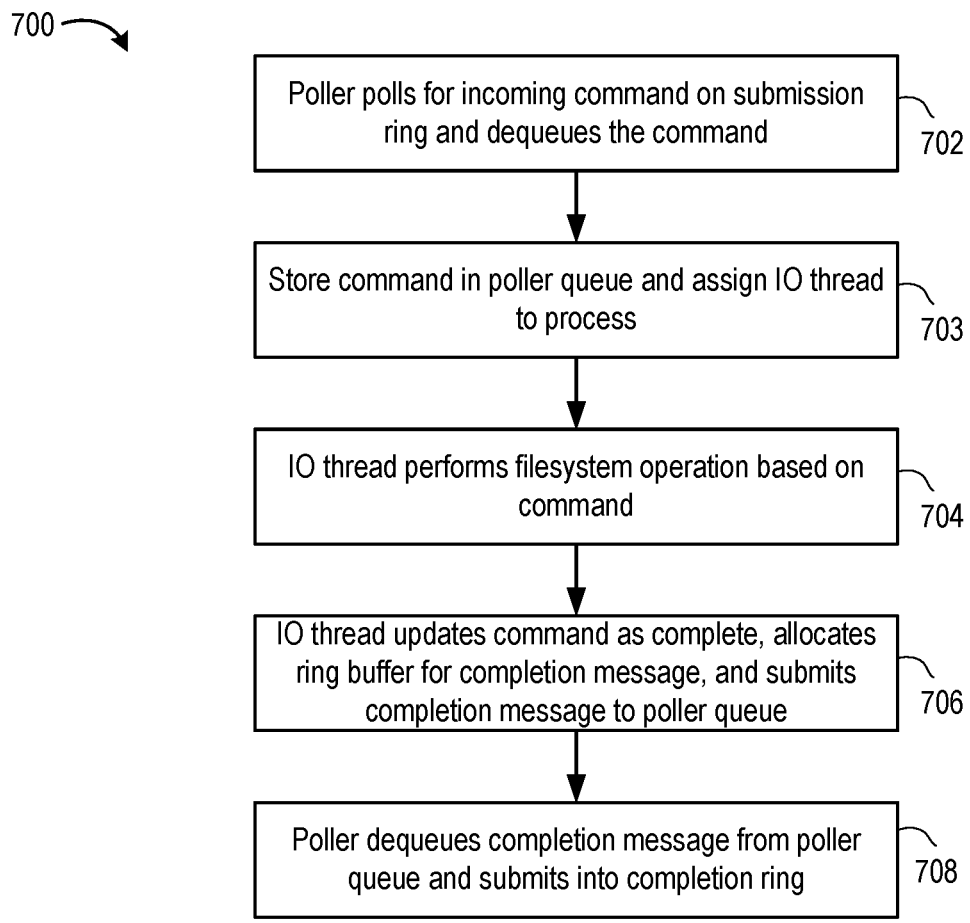
FIG. 7 is a flow diagram depicting a method of receiving a command from a client driver at a filesystem server through a shared memory channel according to an embodiment.

FIG. 7 is a flow diagram depicting a method 700 of receiving a command from a client driver at a filesystem server through a shared memory channel according to an embodiment. The shared memory channel includes the submission and completion rings, as discussed above.

Method 700 begins at step 702, where poller thread 512 polls submission ring 508 for the incoming command. Poller thread 512 dequeues the command from submission ring 508 and adds the command to the poller queue 514. At step 703, poller thread 512 submits the command to poller queue 514 and wakes up an IO thread 516 to process the command. At step 704, IO thread 516 obtains the command from poller queue 514 and performs a filesystem operation based on the command (e.g., read or write data). At step 706, IO thread 516 updates the command as complete, selects a ring buffer for a completion message, and submits the completion message to poller queue 514. At step 708, poller thread 512 dequeues the completion message from poller queue 514 and submits the completion message to completion ring 510 by storing the completion message in the selected ring buffer and adjusting the completion ring metadata (e.g., producer head and tail pointers) based on the index of the selected ring buffer.

Techniques for a low-latency shared memory channel across address spaces in a computing system have been described. In an embodiment, the computing system is a virtualized computing system having a client driver in a VM and a filesystem server in a hypervisor. The filesystem server manages a shared storage (e.g., a vSAN). The client driver interfaces with the filesystem server on behalf of client applications executing in the VM. The client driver establishes a shared memory channel between itself and the file system server. The client driver transfers filesystem operations to the filesystem server through the shared memory channel. In this manner, the client driver does not need to make system calls or VM exits to transfer commands and data to the filesystem server executing in the hypervisor. Rather, all commands and data are transferred through the shared memory channel between the address space of the client application and the address space of the hypervisor. System calls and VM exits are only needed to establish the shared memory channel between the client driver and the filesystem server. The filesystem server provides completion messages for the commands back to the client driver through the shared memory channel. Likewise, the filesystem server does not need to make system calls, but rather returns data through the shared memory channel.

The techniques described above provide a shared memory channel between driver 141 and fileserver 137, which enables driver 141 to communicate with fileserver 137 in a manner that minimizes VM exits and context switching. In embodiments, this shared memory channel is used for both control path operations (e.g., control operations on shared storage 170) and data path operations (e.g., reads/writes). In such an embodiment, however, client application 127 makes calls to driver 141 (e.g., system calls) before using the shared memory channel, which results in context switches. In further embodiments, techniques are provided to create a guest application shared memory channel between client application 127 and fileserver 137. The guest application shared memory channel operates in parallel to the "control" shared memory channel (for purposes of distinction) between driver 141 and fileserver 137. The control shared memory channel can be used for control operations and the guest application shared memory channel can be used for data operations (read/write operations). The guest application shared memory channel is established without compromising security, as discussed further below.

Figure 8:
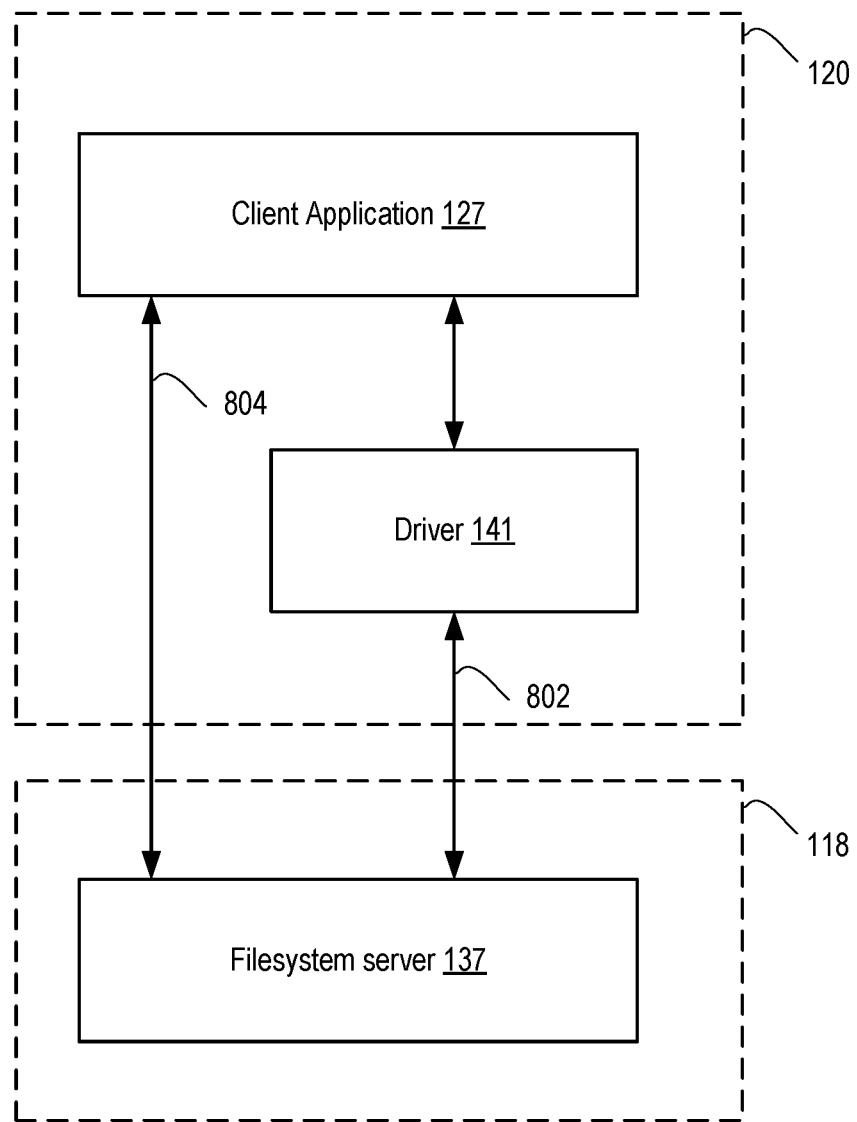
FIG. 8 is a block diagram depicting a logical view of communication among a client application, a driver, and a fileserver according to an embodiment.

FIG. 8 is a block diagram depicting a logical view of communication among a client application, a driver, and a fileserver according to an embodiment. Client application 127 and driver 141 execute in a VM 120. Fileserver 137 executes in hypervisor 118. Client application 127 executes in user-mode and driver 141 can execute in user-mode or kernel-mode. Fileserver 137 can execute in user-mode.

In embodiments, driver 141 and fileserver 137 cooperate to create control shared memory channel 802 using the techniques described above. However, in the present embodiment, client application 127 does not use control shared memory channel 802 for data path operations. Rather, client application 127 cooperates with driver 141 to create a guest application shared memory channel 804 between client application 127 and fileserver 137. Guest application shared memory channel 804 can be configured identical to or similar to control shared memory channel 802 (e.g., using a submission ring, completion ring, ring buffers, etc. as described above). Client application 127 also cooperates with driver 141 to provide identification information to fileserver 137 that allows fileserver 137 to authenticate client application 127 for data path operations over guest application shared memory channel 804. Client application 127 then generates data path commands (e.g., read/write commands) and submits them to fileserver 137 over guest application shared memory channel 804 with the identification information used for authentication. Fileserver 137 authenticates client application 127 and performs the data path operations per the commands. Fileserver 137 returns completion messages to client application 127 through guest application shared memory channel 804. In this manner, client application 127 directly communicates with fileserver 137 for data path operations in a secure fashion without making system calls to driver 141 and without context switches.

Figure 9:
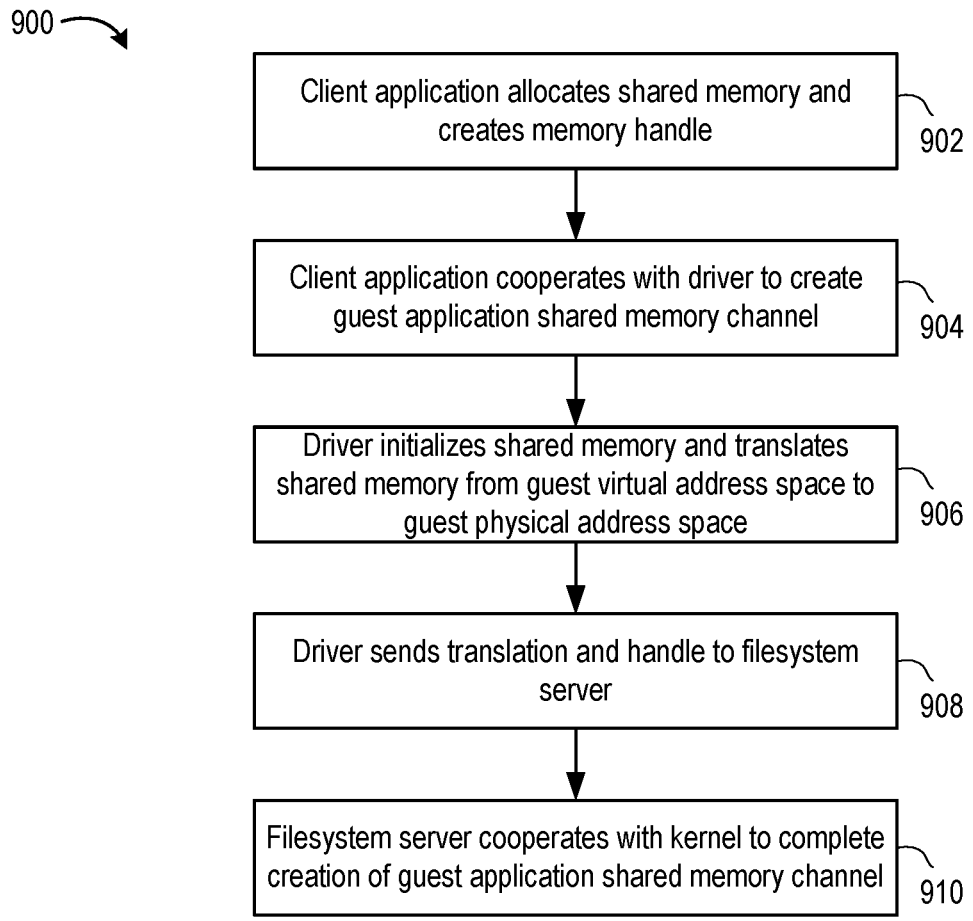
FIG. 9 is a flow diagram depicting a method of creating a guest application shared memory channel between a client application executing in a VM and a fileserver executing in a hypervisor according to an embodiment.

FIG. 9 is a flow diagram depicting a method 900 of creating a guest application shared memory channel between a client application executing in a VM and a fileserver executing in a hypervisor according to an embodiment. Method 900 can be used to create guest application shared memory channel 804 between client application 127 and fileserver 137, as shown in FIG. 8.

Method 900 begins at step 902, where client application 127 allocates shared memory within its guest virtual address space and creates a memory handle. As described above, the memory handle can identify client application 127 (e.g., process ID) and the shared memory within the guest virtual address space. At step 904, client application 127 cooperates with driver 141 to request creation of guest application shared memory channel 804 (e.g., via a system call). At step 906, driver 141 initializes the shared memory (e.g., generates ring buffers and associated metadata for submission/completion rings) and translates the shared memory from the guest virtual address space to the guest physical address space. That is, driver 141 obtains physical page numbers for the shared memory through translations of the guest virtual page numbers. Driver 141 can cooperate with guest OS 126 to obtain the memory translations from the page tables managed by guest OS 126.

At step 908, driver 141 sends the translation and handle to fileserver 137. In an embodiment, driver 141 can communicate with fileserver 137 using an inter-process communication channel (e.g., virtual socket) as described above. Alternatively, driver 141 can communicate with fileserver 137 over control shared memory channel 802 using command(s) that request creation of guest application shared memory channel 804. At step 910, fileserver 137 cooperates with kernel 134 to complete creation of guest application shared memory channel 804. As noted above, kernel 134 maintains page tables that map guest physical addresses to machine addresses. Kernel 134 returns machine page numbers for the physical page numbers provided by driver 141. The machine page numbers comprise machine addresses in a machine address space of hypervisor 118. Filesystem server 137 uses the machine page numbers to identify and use the shared memory, establishing guest application shared memory channel 804 between client application 127 and filesystem server 137.

Figure 10:
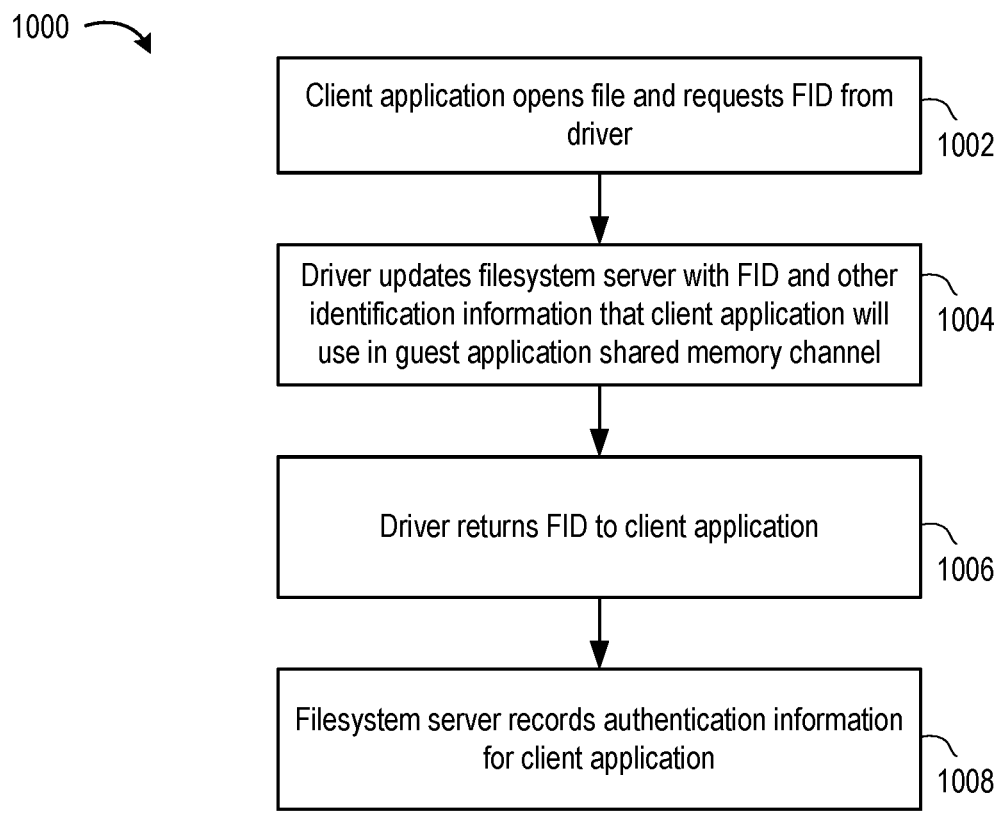
FIG. 10 is a flow diagram depicting a method of providing authentication information from a client application to a filesystem server for use in communication over a guest application shared memory channel according to an embodiment.

FIG. 10 is a flow diagram depicting a method 1000 of providing authentication information from a client application to a filesystem server for use in communication over a guest application shared memory channel according to an embodiment. Method 1000 can be used to provide authentication information between client application 127 and fileserver 137 over guest application shared memory channel 804, as shown in FIG. 8.

Method 1000 begins at step 1002, where client application 127 cooperates with driver 141 to open a file and request a file ID (FID). At step 1004, driver 141 updates filesystem server 137 with authentication information that client application 127 will use in guest application shared memory channel 804. In an embodiment, the authentication information includes the FID. In an embodiment, authentication information includes other information in addition to the FID, such as a connection ID, a shared memory ID, and/or the like. At step 1006, driver 141 returns the FID to client application 127. At step 1008, filesystem server 137 records the authentication information to be used by client application 127.

Figure 11:
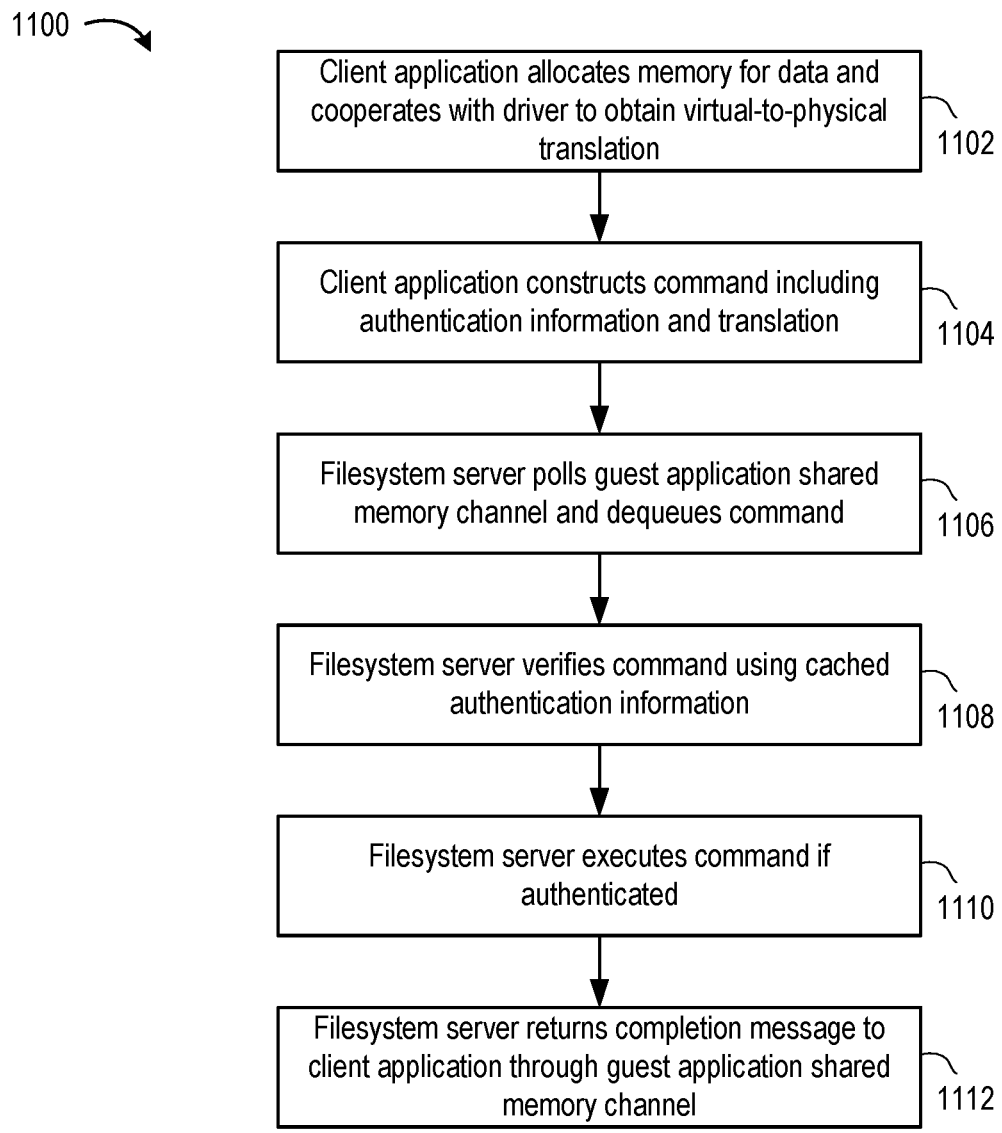
FIG. 11 is a flow diagram depicting a method of performing data path operations between a client application and a filesystem server over a guest application shared memory channel according to an embodiment.

FIG. 11 is a flow diagram depicting a method 1100 of performing data path operations between a client application and a filesystem server over a guest application shared memory channel according to an embodiment. Method 1100 can be used to perform data path operations between client application 127 and fileserver 137 over guest application shared memory channel 804, as shown in FIG. 8.

Method 1100 begins at step 1102, where client application 127 allocates memory within its guest virtual address space for data and cooperates with driver 141 to obtain the virtual-to-physical translation for the allocated memory (e.g., physical page numbers mapped to the guest virtual page numbers). The allocated memory stores the data to be written or will store the data to be read by the data path operation (e.g., a read operation or a write operation). At step 1104, client application 127 constructs a data path command (a read or a write) that includes the authentication information and the translation. The authentication information includes information that was exchanged with filesystem server 137 above (e.g., FID, connection ID, shared memory ID, etc.).

At step 1106, filesystem server 137 polls guest application shared memory channel 804 and dequeues the command. At step 1108, filesystem server 137 verifies the command using by comparing the authentication information in the command with its cached authentication information for client application 127. At step 1110, filesystem server 137 executes the command if authenticated. At step 1112, filesystem server 137 returns a completion message to client application 127 through guest application shared memory channel 804.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of communication between a client application and a filesystem server, the method comprising:
   allocating a first shared memory in a guest virtual address space of the client application, wherein the client application uses addressing of the guest virtual address space to access the first shared memory, wherein the client application executes in a virtual machine (VM) running on a host computer, wherein the host computer runs a hypervisor that provides an execution environment for the VM, wherein the hypervisor comprises the filesystem server configured to provide an interface to a storage of the host computer, wherein the filesystem server operates in a machine address space different than the guest virtual address space;
   creating a shared memory channel between the client application and the filesystem server, the shared memory channel using the first shared memory, wherein the filesystem server uses addressing in the machine address space to access the first shared memory;
   sending authentication information associated with the client application to the filesystem server; and
   submitting a command, to access the storage, in the shared memory channel from the client application to the filesystem server, the command including the authentication information.

2. The method of claim 1, wherein creating the shared memory channel comprises:
   initializing the first shared memory with metadata and a plurality of ring buffers;
   determining a first translation of the first shared memory from the guest virtual address space of the client application to a guest physical address space of the VM;
   sending the first translation to the filesystem server; and
   determining, by the filesystem server, a second translation of the first shared memory from the guest physical address space to the machine address space of the hypervisor.

3. The method of claim 1, wherein sending the authentication information comprises:
   opening, by the client application, a file having a file identifier; and
   sending, to the filesystem server, the file identifier as at least a portion of the authentication information.

4. The method of claim 3, wherein sending the authentication information further comprises:
   sending, to the filesystem server, at least one additional identifier associated with the client application as at least another portion of the authentication information.

5. The method of claim 1, further comprising:
   dequeuing, at the filesystem server, the command from the shared memory channel;
   verifying the authentication information in the command against the sent authentication information; and
   executing the command.

6. The method of claim 5, further comprising:
   returning a completion message for the command from the filesystem server to the client application through the shared memory channel.

7. The method of claim 1, wherein the filesystem server executes in a user space of the hypervisor.

8. A non-transitory computer readable medium having instructions stored thereon that when executed by a system cause the system to perform operations for communication between a client application and a filesystem server, the operations comprising:
   allocating a first shared memory in a guest virtual address space of the client application, wherein the client application uses addressing of the guest virtual address space to access the first shared memory, wherein the client application executes in a virtual machine (VM) running on a host computer, wherein the host computer runs a hypervisor that provides an execution environment for the VM, wherein the hypervisor comprises the filesystem server configured to provide an interface to a storage of the host computer, wherein the filesystem server operates in a machine address space different than the guest virtual address space;

creating a shared memory channel between the client application and the filesystem server, the shared memory channel using the first shared memory, wherein the filesystem server uses addressing in the machine address space to access the first shared memory;

sending authentication information associated with the client application to the filesystem server; and submitting a command, to access the storage, in the shared memory channel from the client application to the filesystem server, the command including the authentication information.

9. The non-transitory computer readable medium of claim 8, wherein creating the shared memory channel comprises:

initializing the first shared memory with metadata and a plurality of ring buffers;

determining a first translation of the first shared memory from the guest virtual address space of the client application to a guest physical address space of the VM;

sending the first translation to the filesystem server; and determining, by the filesystem server, a second translation of the first shared memory from the guest physical address space to the machine address space of the hypervisor.

10. The non-transitory computer readable medium of claim 8, wherein sending the authentication information comprises:

opening, by the client application, a file having a file identifier; and sending, to the filesystem server, the file identifier as at least a portion of the authentication information.

11. The non-transitory computer readable medium of claim 10, wherein sending the authentication information further comprises:

sending, to the filesystem server, at least one additional identifier associated with the client application as at least another portion of the authentication information.

12. The non-transitory computer readable medium of claim 8, wherein the operations further comprise:

dequeuing, at the filesystem server, the command from the shared memory channel;

verifying the authentication information in the command against the sent authentication information; and executing the command.

13. The non-transitory computer readable medium of claim 12, wherein the operations further comprise:

returning a completion message for the command from the filesystem server to the client application through the shared memory channel.

14. The non-transitory computer readable medium of claim 8, wherein the filesystem server executes in a user space of the hypervisor.

15. A computing system, comprising:
one or more processors; and
at least one memory, the one or more processors and the at least one memory configured to:
allocate a first shared memory in a guest virtual address space of a client application, wherein the client application uses addressing of the guest virtual address space to access the first shared memory, wherein the client application executes in a virtual machine (VM) running on a host computer, wherein the host computer runs a hypervisor that provides an execution environment for the VM, wherein the hypervisor comprises a filesystem server configured to provide an interface to a storage of the host computer, wherein the filesystem server operates in a machine address space different than the guest virtual address space;

create a shared memory channel between the client application and the filesystem server, the shared memory channel using the first shared memory, wherein the filesystem server uses addressing in the machine address space to access the first shared memory;

send authentication information associated with the client application to the filesystem server; and submit a command, to access the storage, in the shared memory channel from the client application to the filesystem server, the command including the authentication information.

16. The computing system of claim 15, wherein to create the shared memory channel comprises to:

initialize the first shared memory with metadata and a plurality of ring buffers;

determine a first translation of the first shared memory from the guest virtual address space of the client application to a guest physical address space of the VM;

send the first translation to the filesystem server; and determine, by the filesystem server, a second translation of the first shared memory from the guest physical address space to the machine address space of the hypervisor.

17. The computing system of claim 15, wherein to send the authentication information comprises to:

open, by the client application, a file having a file identifier; and send, to the filesystem server, the file identifier as at least a portion of the authentication information.

18. The computing system of claim 17, wherein to send the authentication information comprises to:

send, to the filesystem server, at least one additional identifier associated with the client application as at least another portion of the authentication information.

19. The computing system of claim 15, wherein the one or more processors and the at least one memory are further configured to:

dequeue, at the filesystem server, the command from the shared memory channel;

verify the authentication information in the command against the sent authentication information; and execute the command.

20. The computing system of claim 19, wherein the one or more processors and the at least one memory are further configured to:

return a completion message for the command from the filesystem server to the client application through the shared memory channel.

* * * * *